United States Patent [19]

Yazaki et al.

[11] Patent Number: 4,703,211
[45] Date of Patent: Oct. 27, 1987

[54] SLOTLESS BRUSHLESS DC MOTOR

[75] Inventors: Asao Yazaki, Shimoina; Takashi Sunaba; Yoshihiro Takemura, both of Komagane, all of Japan

[73] Assignee: Shinano Tokki Corporation, Nagano, Japan

[21] Appl. No.: 890,700

[22] Filed: Jul. 24, 1986

[30] Foreign Application Priority Data

Nov. 21, 1985 [JP] Japan ............... 60-259670

[51] Int. Cl.⁴ ............................... H02K 1/00
[52] U.S. Cl. .................................... 310/179; 310/45; 310/156; 310/184; 310/254
[58] Field of Search ............ 310/46, 40 MM, 43, 45, 310/179, 156, 208, 216, 254, 180, 184

[56] References Cited

U.S. PATENT DOCUMENTS 2,743,508  5/1956  Issacson ............... 310/184 UX
3,495,114  2/1970  Kazansky ............... 310/208
4,130,769 12/1978  Karube ................. 310/156
4,488,075 12/1984  De Cesare ............. 310/216

FOREIGN PATENT DOCUMENTS 1082972  6/1960  Fed. Rep. of Germany ........ 310/46
2028228 12/1970  Fed. Rep. of Germany ........ 310/46
1463915 12/1970  Fed. Rep. of Germany ........ 310/45
0027505  3/1977  Japan ........................ 310/46

*Primary Examiner*—R. Skudy
*Attorney, Agent, or Firm*—Welsh & Katz

[57] ABSTRACT

A slotless, brushless DC motor having thin, flat coils fixed to the inner surface of a thin insulating cover attached to the cylindrical inner surface of the stator core of the motor. The coil ends are bent and fixed to the insulating cover over the end faces of the stator core. The structure provides a reduced air gap increasing the rotor efficiency and a reduced axial length of the motor. The coils are arranged such that adjacent coils sides are in contact with each other and may be connected in a Y-configuration or a Δ-configuration.

7 Claims, 11 Drawing Figures

FIG. 4(a)
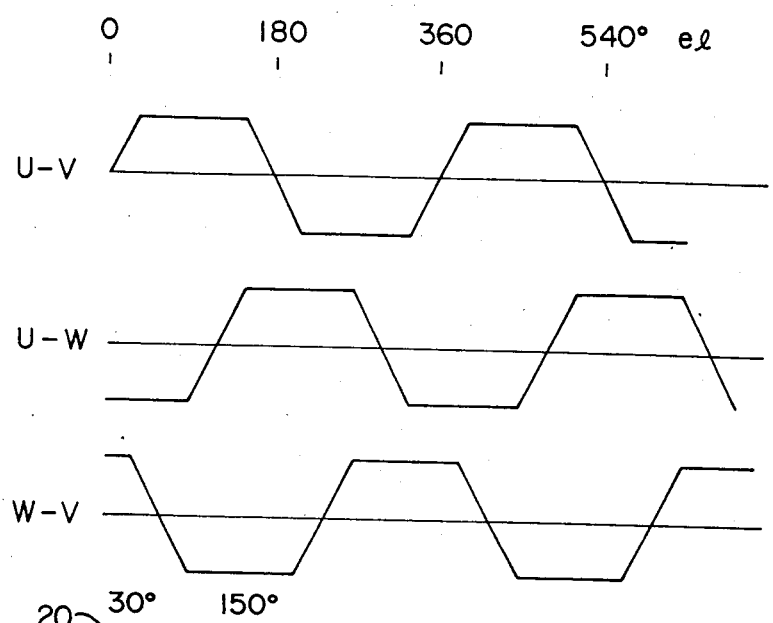
FIG. 4(b)
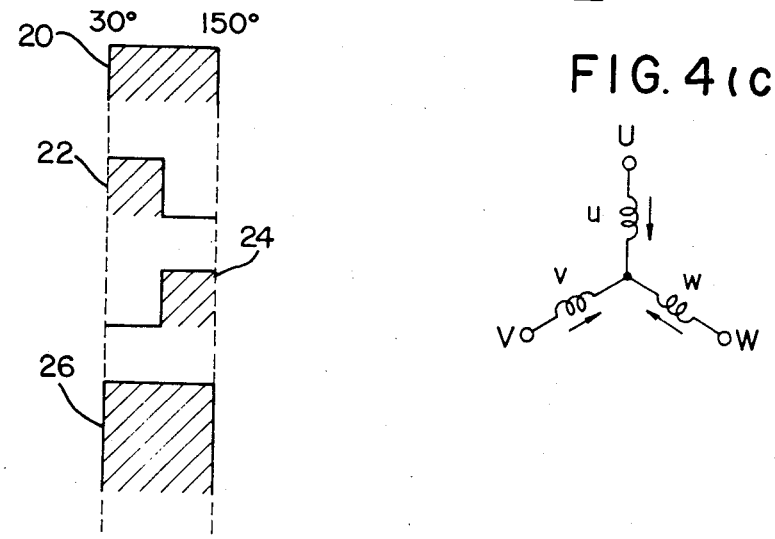
FIG. 4(c)

FIG. 5(a)
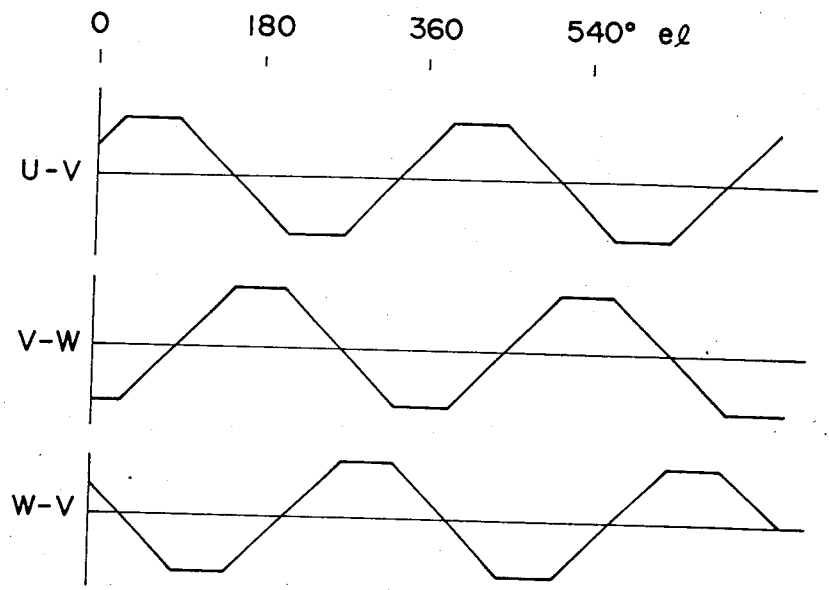
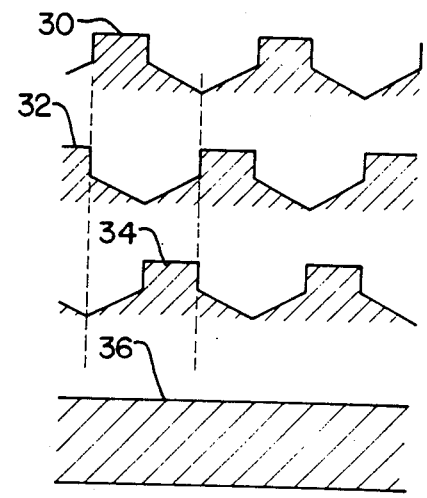
FIG. 5(b)
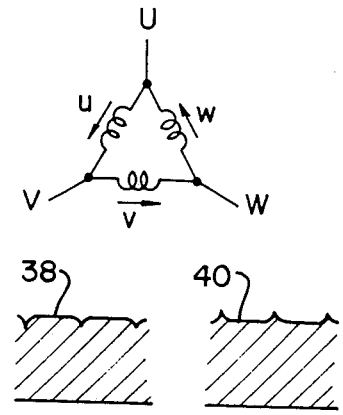
FIG. 5(c)

SLOTLESS BRUSHLESS DC MOTOR

BACKGROUND OF THE INVENTION

1. Field of the Invention

The present invention relates to a slotless brushless DC motor employing a slotless stator core so that no cogging force is produced and a coil arrangement capable of producing a uniform electromagnetic torque.

2. Description of the Prior Art

Conventional axial gap type motors and inner rotor type motors having a permanent magnet rotor which rotates inside a stator core are brushless DC motors which produce no cogging force. However, the axial gap type of motor has a number of disadvantages including: (1) the rotor has a large moment of inertia, (2) the rotor generates noise when rotated at a high speed, (3) the motor is unable to produce a uniform torque when fabricated using a conventional structure in which the coils are arranged or the rotor is magnetized in a fan-shape. An inner rotor type brushless DC motor employing a toothed plastic bobbin for winding coils has the disadvantage that the air gap is large, and hence the permanent magnets of the rotor are unable to function efficiently.

SUMMARY OF THE INVENTION

Accordingly, it is an object of the present invention to provide a slotless brushless DC motor of the inner rotor type employing a rotor having a small moment of inertia, capable of producing a uniform torque, and constructed with a small air gap length so that the permanent magnets will function efficiently.

Briefly, according to one embodiment of the present invention, there is provided a slotless brushless DC motor comprising, a stator core, a permanent magnet rotor rotatably supported so as to rotate within a space enclosed by the stator core, and an insulating cover fixed to the stator core so as to cover the cylindrical inner surface and the end faces of the stator core. Single layer coils of a number three times that of magnetic pole pairs are fixed to the inner surface of the insulating cover with the respective coil sides of the adjacent single layer coils in contact with each other. The circumferential position of the single layer coils is determined by protrusions formed in the inner circumference of the insulating cover and the coil ends of said single layer coils are bent and fixed to the flanges of the insulating cover covering the end faces of the stator core. The single layer coils may be energized alternately in order of their arrangement with a phase difference of 120°.

The single layer coils may be connected in either a Δ-configuration or a Y-configuration and may be energized sequentially and alternately at a phase difference of 120° to generate a revolving magnetic field having the same number of poles as that of the rotor, such that the rotor produces a torque. Since the single layer coils are fixed to the inner surface of the insulating cover with the respective coil sides of the adjacent single layer coils in contact with each other and the coil ends are fixed to the flanges of the insulating cover covering the end faces of the stator core, the single layer coils are held firmly even if the wall thickness of the insulating cover is small. Since the coils are single layer winding coils and the wall thickness of the insulating cover is small, the air gap length may be kept small. Accordingly, the magnetic effect of the permanent magnets of the rotor is less reduced and contributes efficiently to producing a torque. Furthermore, since the stator core is a slotless stator core, and the coils are held on the insulating cover at correct positions by the protrusions formed in the insulating cover at a maximum pitch corresponding to an electrical angle of approximately 120°, a uniform resultant torque having little ripple can be produced by properly selecting the coil exciting period. Moreover, since the coils may be wound solidly beforehand in a predetermined shape, the coils can be securely fixed to the stator by an adhesive at the correct position.

The above and other objects, features and advantages of the present invention will become more apparent from the following description of the preferred embodiment taken in conjunction with the accompanying drawings.

BRIEF DESCRIPTION OF THE DRAWINGS

FIG. 4a is a torque chart illustrating the variation of produced torque with the electrical angle for a Y-configuration.

FIG. 4b is a torque chart illustrating the relationship between produced torque and excitation width for a Y-configuration.

FIG. 4c illustrates a Y-configuration of the coils in accordance with the invention.

FIG. 5a is a torque chart illustrating the variation of produced torque with the electrical angle for a Δ-configuration.

FIG. 5b is a torque chart illustrating the relationship between produced torque and excitation width for a Δ-configuration.

FIG. 5c illustrates a Δ-configuration of the coils in accordance with the invention.

DESCRIPTION OF THE PREFERRED EMBODIMENT

Figure 1:
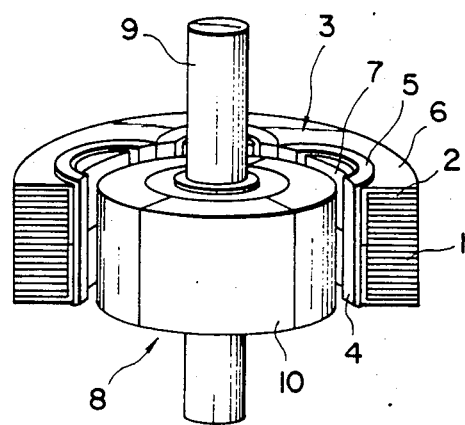
FIG. 1 is a sectional perspective view illustrating a permanent magnet rotor and a stator core which may be employed in a preferred embodiment of the present invention, in which the stator core is cut in half.
Figure 2:
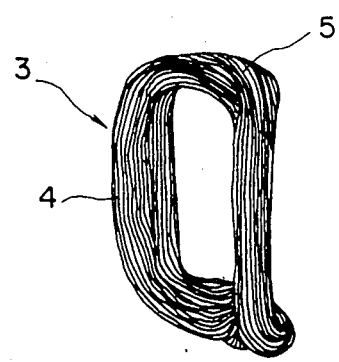
FIG. 2 is a perspective view illustrating a specific embodiment of a coil according to the invention.

Referring to FIGS. 1 and 2, a stator core 1 is formed by laminating annular thin steel plates. An insulating cover 2 for covering the cylindrical inner surface and the end faces of the stator core 1 is fixed to the stator core 1. The insulating cover 2 may be a resin molding having a wall thickness of about 0.2 to 0.3 mm, which need not have any particular mechanical strength. The insulating cover 2 may be formed integrally with the stator core 1 through a composite molding process or may be formed in equal halves and fixed adhesively to the stator core 1 as illustrated in FIG. 1. Coils 3 of a number three times that of pairs of magnetic poles (six coils in the illustrated embodiment only three of which are shown in the cutaway view illustrated in FIG. 1) are arranged at equal circumferential intervals over the inner surface of the insulating cover 2. Each coil 3 with the respective coil sides 4 has a width corresponding to an electrical angle of 30° in contact with the coil sides 4 of the adjacent coil 3 and is fixed adhesively to the insulating cover 2. The coil ends 5 of the coils 3 are bent along and fixed to the end faces 6 of the insulating cover 2. Each coil 3 is formed beforehand in a shape as illustrated in FIG. 2 by winding a self-fusing wire. The circumferential position of the coil 3 is determined by a protrusion 7 having a circumferential width corresponding to an electrical angle of 60°. The coil sides 4 of the coils 2 have a slightly curved shape each having a surface curved along the inner circumference of the stator core 1.

A rotor 8 is formed by fixing four permanent magnets 10 to a rotary shaft 9 with alternate opposing magnetic poles. The rotor 8 is supported so as to rotate within the stator core 1 with a small air gap between the outer circumference of the permanent magnets 10 and the inner surface of the coil sides 4.

Figure 3:
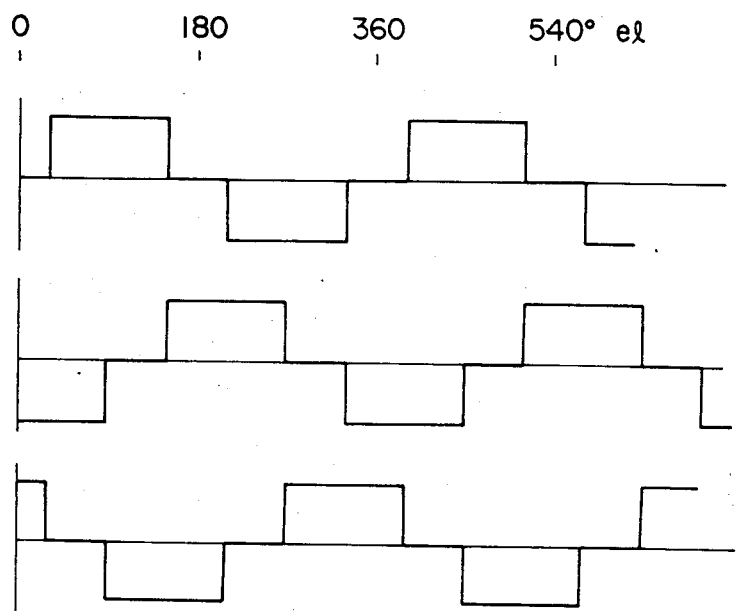
FIG. 3 is a waveform chart illustrating the current waveforms of the coils of the slotless brushless DC motor of the present invention.

The coils 3 are connected to form a U-phase, V-phase and W-phase in the order of arrangement. A three-phase current of a rectangular waveform, such as illustrated in FIG. 3 as waveforms A, B, and C, is supplied to the coils 3 using a conventional controller such as are well known in the art. The controller, in the conventional manner, supplies a three-phase current on the basis of an angular position signal corresponding to the angular position of a permanent magnets 10. In FIG. 3, the current supply width corresponds to 120° in electrical angle.

The coils 3 may be connected in either a Y-configuration or Δ-configuration. Conditions for producing a uniform torque are different between the Y-configuration and the Δ-configuration. FIGS. 4a, 4b and 4c illustrate an example of conditions for producing a uniform torque when the coils 3 are connected in a Y-configuration. FIG. 4a shows the relation of the produced torque to the angular position (electrical angle) of the rotor when a current is supplied to the coils. FIG. 4c diagrammatically illustrates a Y-configuration with arrows indicating the positive direction of the current. FIG. 4b shows the respective produced torque curves 20, 22 and 24 corresponding to FIG. 4a and to the current supply widths shown in FIG. 3. The resultant torque is constant within the range of 30 to 150 degrees of electrical angle as indicated by the resultant torque curve 26 in FIG. 4b. As is apparent from FIGS. 4a, 4b and 4c, when the coils 3 are connected in a Y-configuration, the output torque of the motor is uniform through one turn of the rotor when the produced torque between the phases is flat over 120° in electrical angle.

FIGS. 5a, 5b and 5c illustrate an example of conditions for producing a uniform torque when the coils 3 are connected in a Δ-configuration. FIG. 5a shows the relation of the produced torque to the angular position of the rotor when a current is supplied to the coils. FIG. 5c diagrammatically illustrates a Δ-configuration with arrows indicating the positive direction of the current. FIG. 5b shows respective produced torque curves 30, 32 and 34, corresponding to FIG. 5(a) and the current supply widths shown in FIG. 3, in the range of 30° to 150° electrical angle. In FIG. 5b, torque curves 30, 32 and 34 indicate produced torques when the current is supplied between the U-phase and the V-phase, between the V-phase and the W-phase and between the W-phase and the U-phase, respectively, and torque curve 36 indicates the resultant torque. When the produced torque between the phases is flat over 60° in electrical angle, the output torque of the motor is uniform through one turn of the rotor. When the produced torque is flat over an electrical angle less than 60° or above 60°, the output torque ripples as indicated by torque curve 38 or as indicated by torque curve 40 of FIG. 5b, respectively.

Figure 6A:
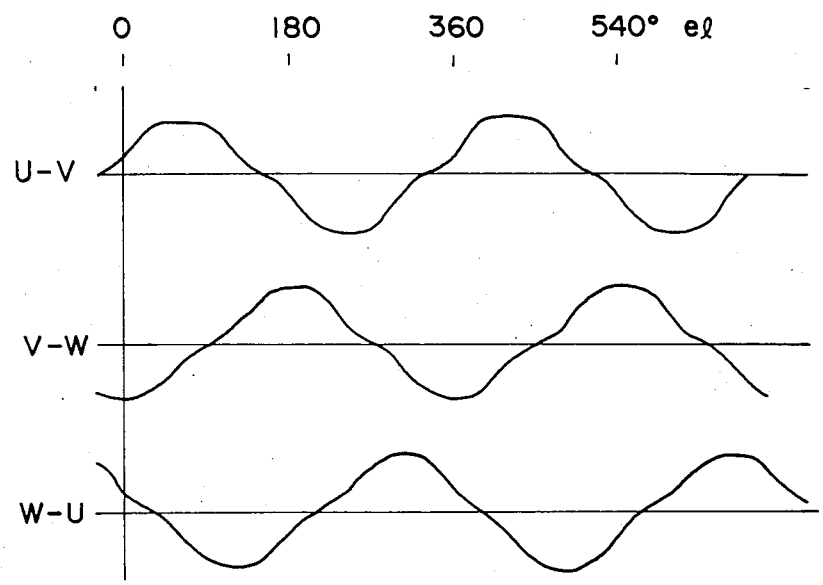
FIGS. 6a and 6b are torque charts illustrating actual torque characteristics for a Δ-configuration.
Figure 6B:
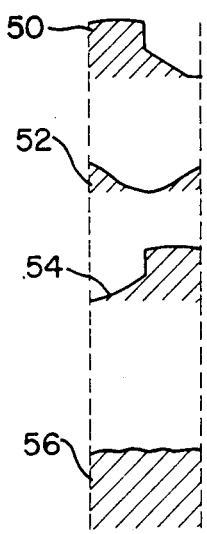

As a practical matter, it is difficult to meet the conditions shown in FIGS. 4a to 4c and 5a to 5c for producing an absolutely uniform output torque due to restrictions on the material, structure and the state of magnetization. Accordingly, in view of the higher harmonic current suppressing effect of the circulating current in the coils of Δ-configuration, it is advantageous to connect the coils in a Δ-configuration. FIGS. 6a and 6b show actual torques produced when the coils are connected in a Δ-configuration. FIGS. 6a and 6b correspond to FIGS. 5a and 5b, respectively, and curves 30, 32, 34 and 36 correspond to curves 50, 52, 54 and 56, respectively. As indicated by curve 56 in FIG. 6b, the resultant torque ripples slightly. However, the near uniform character of the resultant torque may, as a practical matter, be considered to be uniform.

As is apparent from the foregoing description, according to the present invention, comparatively thin flat coils are fixed to the inner surface of the thin insulating cover closely attached to the cylindrical inner surface of the stator core and the coil ends are bent and fixed to the end faces of the insulating cover. Therefore, the coils are fixed firmly, and the air gap length is reduced remarkably as compared with that of the conventional brushless DC motor, and hence the magnetic function of the permanent magnet rotor is highly efficient. Furthermore, since the coil ends are bent and fixed through the insulating cover to the end faces of the stator core, the axial length of the motor can be reduced to the least necessary extent.

Although the invention has been described in its preferred form with a certain degree of particularity, it is to be understood that many variations and modifications of the invention in its various aspects will be apparent to those skilled in the art. It is therefore contemplated to cover by the present invention any and all modifications, variations, or equivalents that fall within the true spirit and scope of the basic underlying principles disclosed and claimed herein.

What is claimed is:

1. A slotless brushless DC motor comprising;
    a stator core enclosing a cylindrical space and having a cylindrical inner surface and end faces;
    a permanent magnet rotor, having at least one magnetic pole pair, rotatively supported so as to rotate within the cylindrical space enclosed by the stator core;
    an insulating cover fixed to the stator core so as to cover the cylindrical inner surface and the end faces of the stator core, and said insulating cover having protrusions formed in the inner cylindrical surface;
    a plurality of single layer coils fixed to the inner surface of the insulating cover such that the position of the single layer coils is determined by the protrusions with respective adjacent single layer coils in contact with each other and said single layer coils having coil ends being bent and fixed to the insulating cover covering the end faces of the stator core.

2. The slotless, brushless DC motor of claim 1 wherein the single layer coils are positioned in a non-overlapping configuration.

3. The slotless, brushless DC motor of claim 1 wherein there are three single layer coils for each magnetic pole pair of the rotor.

4. The slotless, brushless DC motor of claim 3 wherein the single layer coils are energized alternately in the order of arrangement at a phase difference of 120° in electrical angle.

5. The slotless, brushless DC motor of claim 4 wherein the rotor comprises two magnetic pole pairs and the single layer coils are connected in a Y-configuration.

6. The slotless, brushless DC motor of claim 4 wherein the rotor comprises two magnetic pole pairs and the single layer coils are connected in a Δ-configuration.

7. The slotless, brushless DC motor of claim 6 wherein the insulating cover is a resin molding having a thickness between 0.2 and 0.3 mm.

* * * * *